(12) United States Patent
Woodgate et al.

(10) Patent No.: US 8,727,127 B2
(45) Date of Patent: May 20, 2014

(54) SCREEN PANEL FIXING SYSTEM AND METHODS

(75) Inventors: Raymond Maxwell Woodgate, Bacchus Marsh (AU); Marc Raymond Woodgate, Bacchus Marsh (AU); David Charles Alexander James Waller, Newtown (AU)

(73) Assignee: Lettela Pty Limited, Victoria (AU)

( * ) Notice: Subject to any disclaimer, the term of this patent is extended or adjusted under 35 U.S.C. 154(b) by 0 days.

(21) Appl. No.: 13/571,652

(22) Filed: Aug. 10, 2012

(65) Prior Publication Data

US 2013/0037459 A1   Feb. 14, 2013

(30) Foreign Application Priority Data

Aug. 10, 2011   (AU) ................................ 2011903208

(51) Int. Cl.
*B07B 1/49*   (2006.01)

(52) U.S. Cl.
USPC ........... 209/397; 209/408; 209/412; 209/399; 209/403; 209/405

(58) Field of Classification Search
USPC ................... 209/399, 403, 405, 397, 408, 412
See application file for complete search history.

(56) References Cited

U.S. PATENT DOCUMENTS

| | | | |
|---|---|---|---|
| 4,674,251 A | 6/1987 | Wolff | |
| 5,769,241 A * | 6/1998 | Woodgate | 209/399 |
| 5,829,599 A | 11/1998 | Woodgate | |
| 7,413,087 B2 * | 8/2008 | Kriel | 209/405 |
| 2006/0180510 A1 * | 8/2006 | Freissle et al. | 209/405 |
| 2008/0047877 A1 * | 2/2008 | Freissle et al. | 209/405 |
| 2009/0184032 A1 * | 7/2009 | Zubovich | 209/405 |
| 2009/0301944 A1 * | 12/2009 | Kriel | 209/405 |
| 2010/0006481 A1 * | 1/2010 | Waites, Jr. | 209/405 |
| 2011/0240531 A1 * | 10/2011 | Timmerman et al. | 209/405 |
| 2012/0234737 A1 * | 9/2012 | Connolly et al. | 209/405 |

FOREIGN PATENT DOCUMENTS

AU   654091   10/1994

* cited by examiner

*Primary Examiner* — Prasad Gokhale
(74) *Attorney, Agent, or Firm* — D. Peter Hochberg; Sean F. Mellino; Richard A. Wolf

(57) ABSTRACT

A screening apparatus includes beams and screen panels forming a broad screening surface. Each panel is mounted to a pair of beams along opposite side edges to bridge between two adjacent beams. The panels are mounted to an upwardly facing edge of the beams by elongate fixing members extending in the longitudinal direction of the beams. The fixing members engage opposite side edges of the panels and include a pair of projections that extend into openings provided in the edge of the beams. Each projection is engaged by a locking clip to prevent release from the openings. The openings into which the projections extend are of greater diameter than the outside diameter of the projections providing a loose fit within the openings, to allow movement of the fixing rails and the screen panels before the projections are engaged by a locking clip.

18 Claims, 6 Drawing Sheets

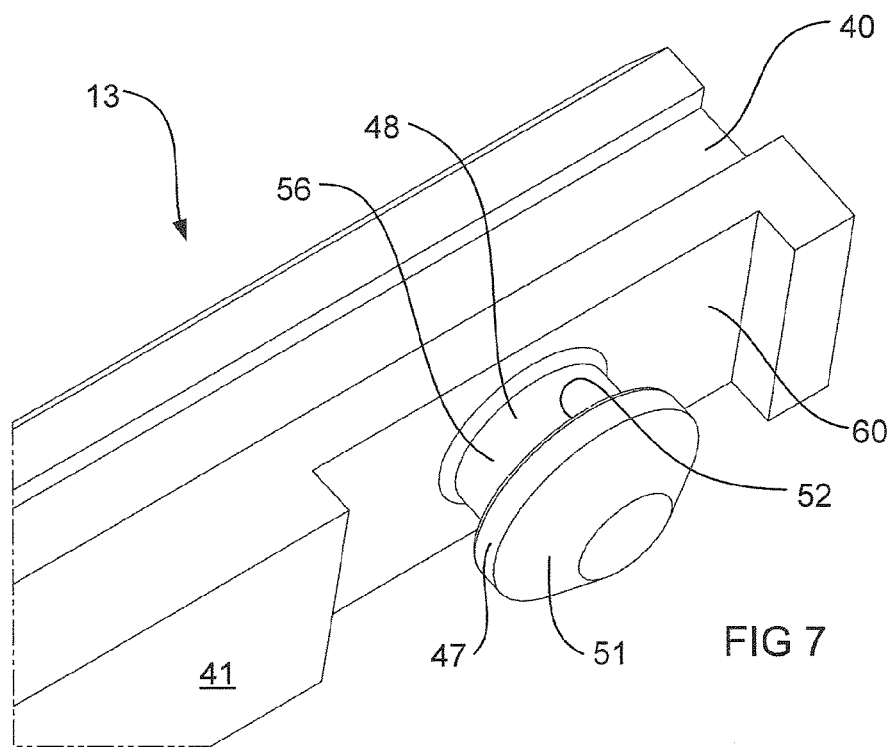
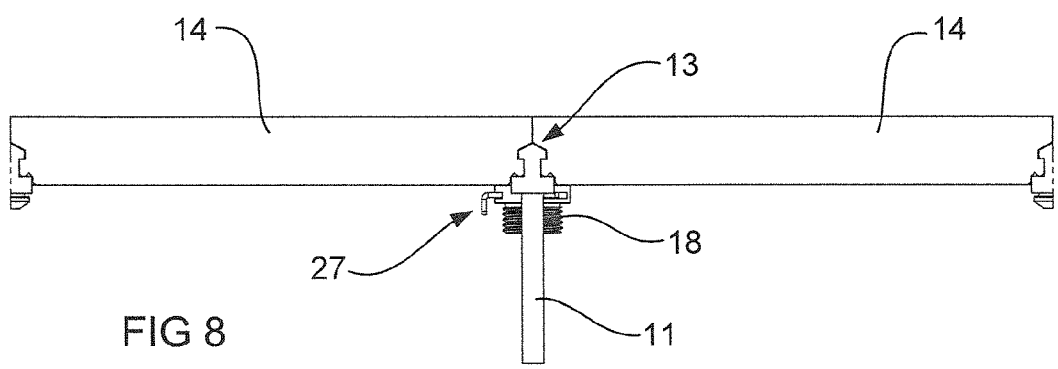

SCREEN PANEL FIXING SYSTEM AND METHODS

CROSS-REFERENCE TO RELATED APPLICATIONS

This application claims priority from Australian Patent Application No. 2011903208 filed on Aug. 10, 2011 which is incorporated herein by this reference in its entirety.

BACKGROUND OF THE INVENTION

1. Field of the Invention

The present invention relates generally to apparatus for screening, separating or grading materials, principally for use in the mining industry. The present invention is particularly directed to arrangements for fixing screen panels to the support frame of a vibratory screening machine and to the screen panels themselves. The system and panels are applicable for screening, separating and grading ores and other materials, and it will be convenient to hereinafter describe the invention in relation to that use. It is to be appreciated, however, that the invention is not limited to such apparatus and use.

2. Description of the Prior Art

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Screening apparatus of the type with which the invention is concerned is generally used for screening, grading, or separating materials such as ores and comprises an array of screen panels which are removably fixed to a frame to provide a continuous screen deck. The material to be screened is fed onto the deck at one end and the apparatus is vibrated so that the material moves over and through its screening surface.

One form of screen panel includes a steel frame moulded within a resilient plastic material, such as polyurethane. See for example Australian Patent No. 577767 (66006/86) (also published as U.S. Pat. No. 4,674,251). The plastic moulding forms the major part of the panel and it is in the plastic moulding that the openings for screening are provided.

The screen panels in a screen deck are usually subject to wear, due to the abrasiveness of the mining materials typically being screened, and thus the screens require periodical replacement. This presents a difficulty with the attachment of the panels to the deck frame, as the attachment must be secure and robust, but should also be releasable in a manner that is quick and easy.

The frame to which screen panels in a screen deck are secured usually comprises a framework of elongate beams. The beams can be of various section, but the present invention has been developed for the connection of the support panels to a top or upstanding edge of a beam.

SUMMARY OF THE INVENTION

In one form of the invention, there is provided a screening apparatus, including:

a plurality of spaced apart, substantially parallel elongate beams, a plurality of screen panels mounted to the beams to form a broad screening surface, each of the panels being generally square or rectangular to define four side edges and the panels being mounted adjacent to each other so that facing side edges of adjacent panels are in close facing relationship, each panel being mounted to a pair of beams along opposite side edges to bridge between two adjacent beams, the panels being mounted to the beams by elongate fixing members that extend in the longitudinal direction of the beams and that are fixed to an edge of the beams and that engage opposite side edges of the panels, the fixing members including a pair of projections that extend into openings provided in the edge of the beams, each projection being engaged by a locking clip to lock the fixing members against release from the beams, the openings into which the projections extend being of a greater diameter than the outside diameter of the projections, so that the projections are a loose fit within the openings to allow movement of the fixing rails and the screen panels before the projections are engaged by a locking clip to lock the projection against release from the opening.

The present invention advantageously provides a system for connecting fixing members to an upper edge of supporting beams that form part of a screening deck. This system can be used with beams of any cross section that present an upper edge for connection of the fixing rails. In most cases, the beams will be planar beams, which extend in a single plane only and these are known in the industry sometimes as "stringers".

The present invention is also advantageous in providing a relatively simple method of connection between the fixing members and the elongate beams, while it also allows for ease in removal of the fixing rails when required, by disengagement of the locking clips with the projections of the fixing members. Thus, when necessary, the fixing members can be removed and replaced relatively easily, and this might occur for example, if the fixing members are damaged or worn. Damage can occur in some circumstances by the screening media, or they can be damaged when panels are being removed or inserted. In general, damage or wear of a fixing member occurs infrequently, and therefore the need for removing a member is not regular, but when it occurs, it is desirable that removal be made quickly and easily.

The invention also provides benefits for the installation of fixing members, by enabling the fixing member a relatively small amount of movement on the beam to which it is fixed so that screen panels can be accurately aligned to form a continuous screening surface. In particular, by the employment of openings into which the projections extend that are of greater diameter than the outside diameter of the projections, so that the projections are a loose fit within the openings, the panels that are fixed to the fixing members on the beams can be shifted a small amount on the supporting deck. Thus, any misalignment between adjacent screening panels can be corrected. The amount of shifting movement need only be minor, as the initial accuracy of positioning of the panels on the screening deck is usually quite good. The shifting movement is generally required to correct small misalignment to ensure that where faces of adjacent screening panels that are intended to engage, the faces engage properly.

The shifting movement of the present invention is not available in some prior art decks, in which the panels are fixed in place once they are fixed to the beams. In those prior art decks, any inaccuracy in the fixing arrangements employed with the panels can leave gaps between the panels. This can result in inefficient performance of a screening deck by allowing screening material to pass through gaps within the deck surface with that material being larger than the screened material is intended to be. There can also be an effect on the structural integrity of the screen deck through the misalignment of the screening panels.

The amount of movement of the panels on the beams can be within the range of between 0-8 mm. Advantageously, by providing round openings in the edge of the beams, the movement can be in any direction. Alternatively, the openings could be formed other than round, such as in the form of elongate slots, if alternative or greater movement in a particular direction is required. In this latter form of the invention, a slot which allows movement perpendicular to the lengthwise extent of the beams could be provided within one range and movement longitudinally of the beams could be provided in a different range. Thus, the invention provides flexibility to provide different levels and directions of movement of the fixing members relative to the beams as considered suitable for the particular screening deck being manufactured.

The openings provided in the edge of the beams can be provided in any suitable form. In some forms of the invention, annular rings are provided to form the openings and those rings are fitted to the edge of the beams. The annular rings can be circular but this is not essential. In some forms of the invention, the rings are fitted into slots which are formed in the edge of the beams. The annular rings can include an annular wall and in that form of the invention, the wall can include an opening through which the locking clip extends for engagement with a projection.

In other forms of the invention, the projections can extend through the annular rings so that a portion of the projections project from the opposite end of the ring to which they entered. In these forms of the invention, the locking clip can be arranged to engage that portion of the projection that extends through or projects from the annular ring. In these forms of the invention, an opening which extends through the wall of the annular ring is not required.

The annular rings can be formed of two or more parts. In these forms of the invention, the first part can be fixed into a slot in the edge of the beam and the second part can be connected to the first part such as by threaded engagement, bayonet fitting or snap fit. Advantageously, in some prior art arrangements, threaded annular rings are already employed and form a first part according to this form of the invention, so that the present invention can be easily retro-fitted by the application of a threaded second part.

The first part can be fitted to the edge of the beam in any suitable manner, and in some forms of the invention, a weld is employed to fit the first part into a slot in the edge of the beam.

In forms of the invention in which the annular ring is formed of two parts, the second part of the annular ring can include an opening through which the locking clip extends. In some forms of the invention including a two part annular ring, at least two openings can be provided for acceptance of the locking clip. This is advantageous, as the connection of a second part to a first part does not necessarily mean that the opening through the second part will always be positioned for good access by the locking clip. For example, if the first part is an internally threaded annular ring and the second part is threaded into engagement with the first part, the final position of the opening in the second part will not be established until the threaded engagement is complete. Thus, a single opening in the second part might be positioned other than optimally for acceptance of the locking clip and the provision of a second or more than two openings in the second part can allow an installer of the locking clip to select the most conveniently positioned opening through which to insert the locking clip.

While some forms of the invention include two openings in the second part, it is equally applicable to include three or four openings, or more as required. The openings can be spaced apart in any suitable spacing, but most likely they will be spaced equidistantly apart.

The annular rings can be positioned within a slot formed in the edge of the beams either to project to a position below the beam edge, flush with the beam edge or above the beam edge. Where the annular rings project to a position above the beam edge, the fixing members can include recesses into which the projecting portion of the annular rings is received.

The locking clips can engage the projections in any suitable manner. In some forms, the locking clips include a space within which the projection is engaged. That space can, in some forms of the invention, be formed by a pair of spaced apart arms which define a space therebetween, which includes an entrance portion and an engagement portion. The arms can be flexible, so that they can shift outwardly from a locking position in order to accept a projection through the entrance portion and can return to the locking position on receipt of the projection into the engagement portion. The invention contemplates an arrangement in which the locking clip is positioned in the opening prior to the projection being inserted into the opening. In that arrangement, the projection is forced into the opening past the locking clip. Alternatively, the invention also contemplates an arrangement in which the projection is first inserted in to the opening of the beam and the locking clip is then itself inserted in the opening to engage the projection. In the latter arrangement, the form of the locking clip which has a pair of spaced apart arms as described above is particularly appropriate for use.

In alternative forms of the invention, the locking clip can include an opening which is closed, i.e. which includes a continuous periphery and which does not include an open or entrance end. Thus, the locking clip can be formed as a plate with a bore or aperture through the plate. In this form of the locking clip, the projection can be pushed through the bore or aperture with the edges of the bore or aperture flexing or distorting resiliently to allow the projection to pass through and recovering so as to lock the projection from release from the beam. The locking clip can achieve this such as by engaging or being engageable with an abutment of the projection.

The projections of the fixing members extend from the base of an elongate rail of the fixing member that extends along the edge of the beam. In addition, the projections can include a shoulder which faces the base or the rail. The locking clip can then engage the projection between the shoulder and the rail so that movement of the projection in a direction out of the opening is prevented by engagement of the locking clip and the shoulder.

The projections of the fixing members can be formed as cylinders and can include an annular recess which is coaxial with the cylinder and the shoulder described above can be a face of the recess which faces the rail. The annular recess can be of any suitable cross section, such as square or U-shaped, and the shoulder described above is the side of the recess that faces upwardly when installed. In these forms of the invention, the locking clip can engage within the recess and while that engagement can be a loose fit, it can also be a friction or even an interference fit, to securely fix the fixing members to the beam.

While the shoulder can be formed as part of an annular recess as discussed above, it can alternatively be formed as a groove in a section of the wall of a projection, or even a lateral projection which extends laterally outwardly from the surface of the projection.

If an annular recess is provided, then the projection will comprise a section of reduced diameter (the annular recess) which is formed between sections of greater diameter. The diameter of the opening in the beam edge can then be of a greater diameter than the diameter of the sections of the projections on either side of the annular recess so that the projections are a loose fit in the openings as required.

It is a feature of the present invention that the locking clip can be arranged so that it is releasable from engagement with a projection so that the fixing member can be released from a beam. Thus, the locking clip can be insertable into the opening formed in the edge of the beam to engage a projection and can be withdrawable from the opening to disengage the projection.

The fixing members can extend for substantially the full length of each of the opposite side edges of the panels so that they can engage the side edges along substantially their full length. In this arrangement, the projections can be positioned towards each longitudinal end of the fixing members.

The present invention also extends to a method of assembling a screening apparatus, the apparatus including:

a plurality of spaced apart, substantially parallel elongate beams which include a plurality of openings formed in an upwardly facing edge of the beams, a plurality of screen panels for mounting to the beams to form a broad screening surface, each of the panels being generally square or rectangular to define four side edges, elongate fixing members for fixing the screen panels to the beams, the fixing members including projections for extending into the openings of the beams, the openings of the beams being of a greater diameter than the outside diameter of the projections, so that the projections are a loose fit within the openings the method including the steps of mounting a pair of fixing members to a pair of beams by inserting the projections of the fixing members into the openings of the beams, mounting a screen panel to the pair of fixing members, shifting the panel and the fixing members relative to the beams so that each side edge of the panel that faces a side edge of an adjacent panel is in alignment with and in abutting contact with the facing side edge of the adjacent panel, and inserting a locking clip to engage each projection so as to fix the fixing members in place on the beam.

BRIEF DESCRIPTION OF THE DRAWINGS

In order that the invention may be more fully understood, some embodiments will now be described with reference to the figures in which:

FIG. 7 is a view of an end portion of the fixing member of FIGS. 5 and 6.

FIG. 8 is a cross sectional view showing a pair of screen panels fixed to a fixing member and beam.

DETAILED DESCRIPTION OF THE PREFERRED EMBODIMENTS

Figure 1:
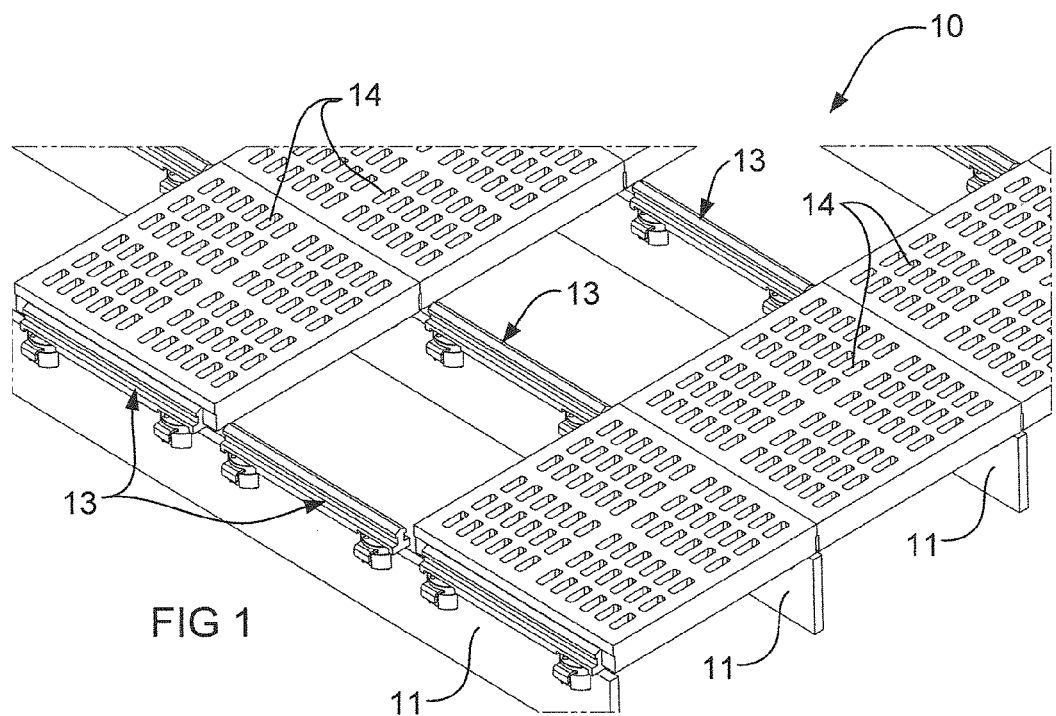
FIG. 1 illustrates a portion of a screening deck according to one embodiment of the invention.

With reference to FIG. 1, a portion of a screening deck 10 is illustrated comprising a plurality of elongate, longitudinal beams 11 each of which is formed from a planar beam section, sometimes known as a "stringer". Each of the beams 11 extends in the longitudinal direction of the screening deck 10, although they can equally extend in a direction perpendicular to the beams 11.

The deck 10 illustrated in FIG. 1 is a portion of a deck only and does not include side edge beams that define the edge of the deck and other components of the deck. These are not necessary to understand the operation of the invention.

The beams 11 extend parallel to one another and present an edge 12 (FIG. 2) to which a plurality of fixing members 13 (FIG. 1) are fixed to support the screen panels 14.

As indicated above, the screening deck 10 is one part of an overall screening apparatus. In practice, the deck 10 is supported on a frame and the entire apparatus is vibrated so that the screen deck 10 vibrates. Openings or apertures in the screen panels 14 allow certain sizes of screening material to fall through and others to remain on top of the deck. Ultimately, the aim of the screening exercise might be to collect the screened material which passes through the panels 14, or the material which remains on top of the panels 14, or both. The process is normally adopted in the mining industry either to separate or sift mined ore, or to size or grade such ore.

FIG. 1 shows several portions of the deck 10 that do not have panels installed. Those portions without panels are intended to illustrate the fixing members 13 that are applied to the edges 12 of the beams 11 shown in FIG. 2. In addition, those portions show how the screen panels 14 are connected along opposite edges to the fixing members 13.

The screen panels 14 form a screening deck in which facing side edges of adjacent panels are in close facing relationship, or most preferably, are in abutting engagement. By this latter arrangement, the screen panel can be assembled so that it does not include gaps between adjacent panels, which can otherwise allow ingress of screening material between panels rather than just through the openings of the screen panels. If that ingress occurs, the screening material can come into contact with components of the screen deck during vibration and can damage or wear those components prematurely. In addition, material that enters any gaps between adjacent panels might pass through the screening deck even though it is oversized relative to the openings in the screen panels and this can compromise the screened material.

It will be evident from the discussion which follows, that the accuracy of fitting between adjacent panels is enhanced by the present invention. It will be evident that the fixing member 13 permits slight movement of the screen panels 14 relative to one another so that accurate alignment between adjacent panels can be achieved.

Figure 2:
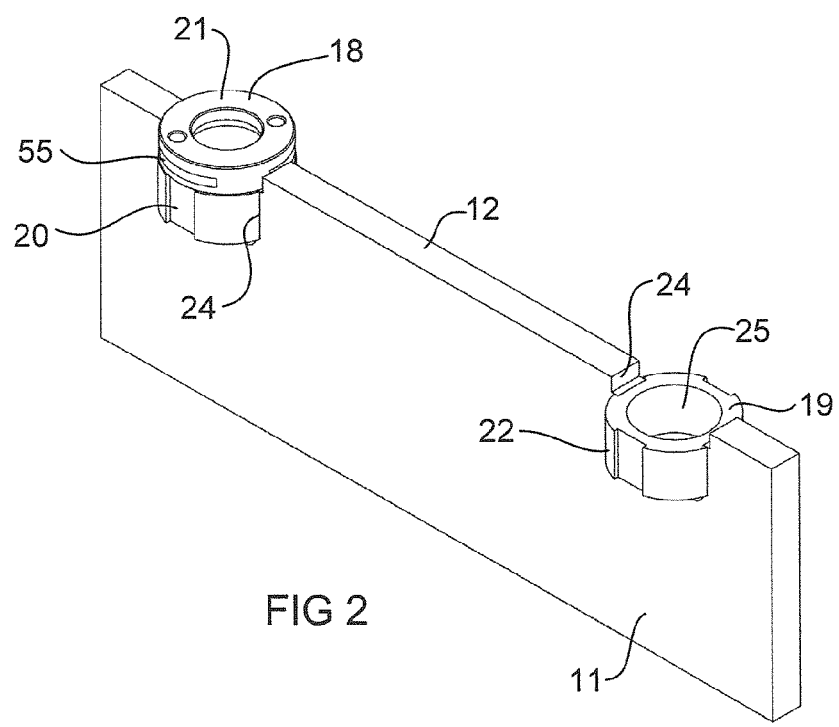
FIG. 2 illustrates a portion of a beam of a screening deck to which the present invention applies.
Figure 3:
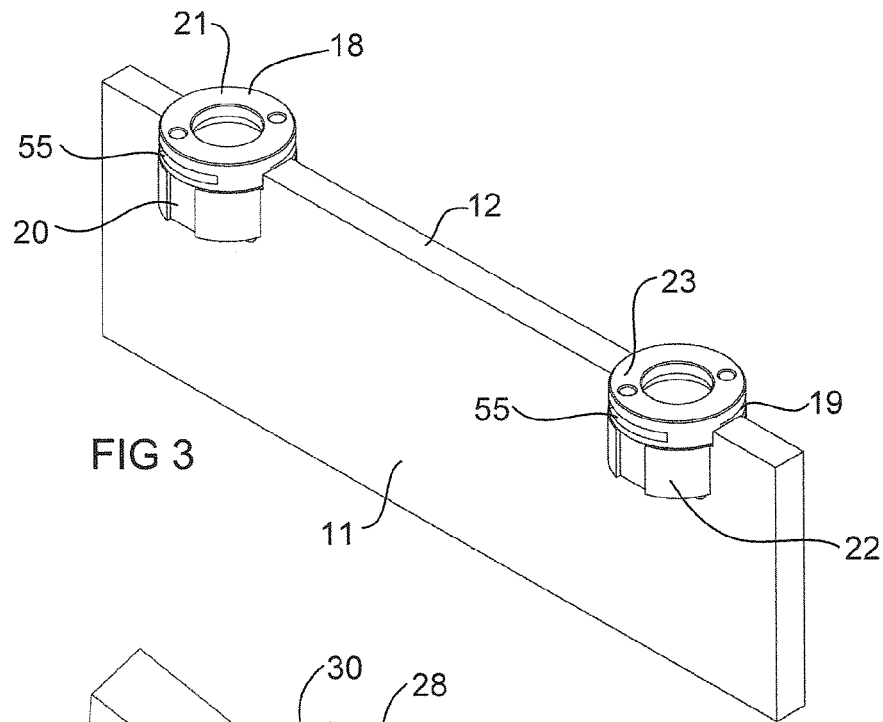
FIG. 3 illustrates the beam portion of FIG. 2 with an additional component fixed thereto.

With reference now to FIGS. 2 and 3, a short section of a beam 11 is illustrated to illustrate one embodiment of the present invention. The beam 11 includes an upward facing edge 12 and a pair of annular rings 18 and 19 which define a central opening for receipt of a projection of a fixing member as will be described later herein. In FIG. 2, the annular ring 18 is shown as having a two part construction, comprising a first part 20 and a second part 21. In FIG. 2, only a first part 22 of the annular ring 19 is shown to facilitate better understanding of the construction of the annular rings. In FIG. 3, the annular ring 19 is shown including both of its first and second parts 22 and 23.

The first parts 20 and 22 of the annular rings 18 and 19 are formed as annular rings which are inserted into slots 24 (FIG. 2) formed in the edge 12 of the beam 11. As illustrated in FIG. 2, the upper end of the first part 22 of the ring 19 is below the edge 12, while the addition of the second part 23 of the ring 19 as shown in FIG. 3 brings the annular ring 19 to a position above the edge 12. This arrangement could be altered so that the upper end of the second part 23 is below the edge 12 or is flush with the edge. The arrangement of the ring 18 is the same as the ring 19 in terms of the position of the first and second parts 20 and 21 relative to the edge 12.

The first parts 20 and 22 are metal and are welded into the slots 24. While not shown, the inner surface 25 of the first parts 20 and 22 is threaded and the second parts 21 and 23 include a complementary threaded outer surface (also not shown) for threaded engagement between the first and second parts of each annular ring 18 and 19.

Figure 4:
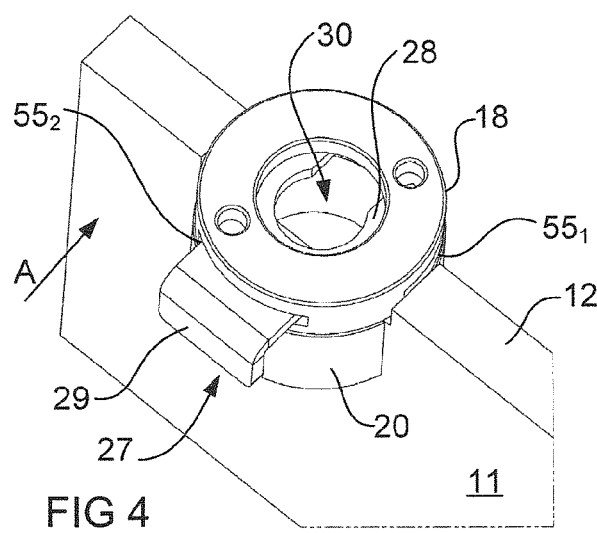
FIG. 4 is a view of a portion of the beam shown in FIGS. 2 and 3, with a locking clip applied.
Figure 4A:
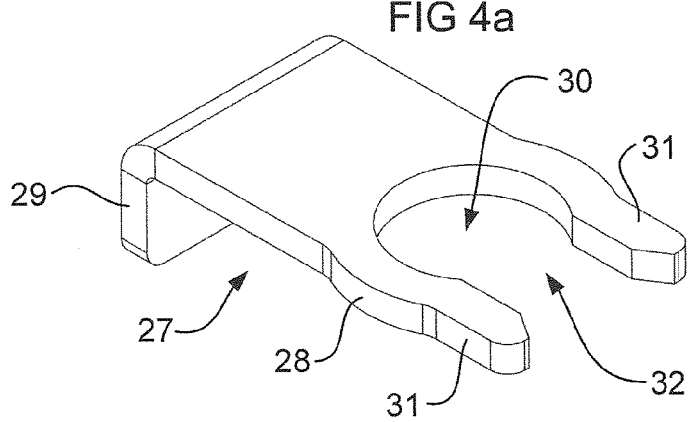
FIG. 4a is a perspective view of a locking clip according to the invention.

The second parts 21 and 23 each includes openings 55 to accept a locking clip, which is shown in more detail in FIGS. 4 and 4a. With reference to FIGS. 4 and 4a, the locking clip 27 includes a first locking part 28 and a second insertion part 29. The insertion part 29 extends substantially perpendicular to the locking part 28. The insertion part 29 can be used to push the locking clip 27 into place and to pull on the locking clip 27 to remove it. However, the shape of the locking clip 27 could be different to that illustrated.

The locking clip 27 includes an opening or space 30 which defines an engagement portion into which a projection of a fixing member can extend. The space 30 is defined by a pair of arms 31 that are resiliently flexible and which define an entrance portion in the form of a narrow entrance 32 which leads to the circular and larger space 30. The locking clip 27 can be formed of any suitable material such as stainless steel, aluminium, plastic and urethane. The locking clip 27 is inserted in the direction A into the annular ring 18 by pressure applied to the insertion part 29 after the projection of a fixing member has been inserted into the annular ring 18. If the locking clip 27 has been formed of a resilient material, the arms 31 can splay or shift outwardly to accept the projection and return resiliently about the projection when the projection has entered the space 30. If the locking clip 27 has been formed of a rigid material, then the projections can distort to allow the arms 31 to engage them in the space 30. Typically, the projections are of a plastic material such as a urethane, which will allow that distortion if required.

Figure 5:
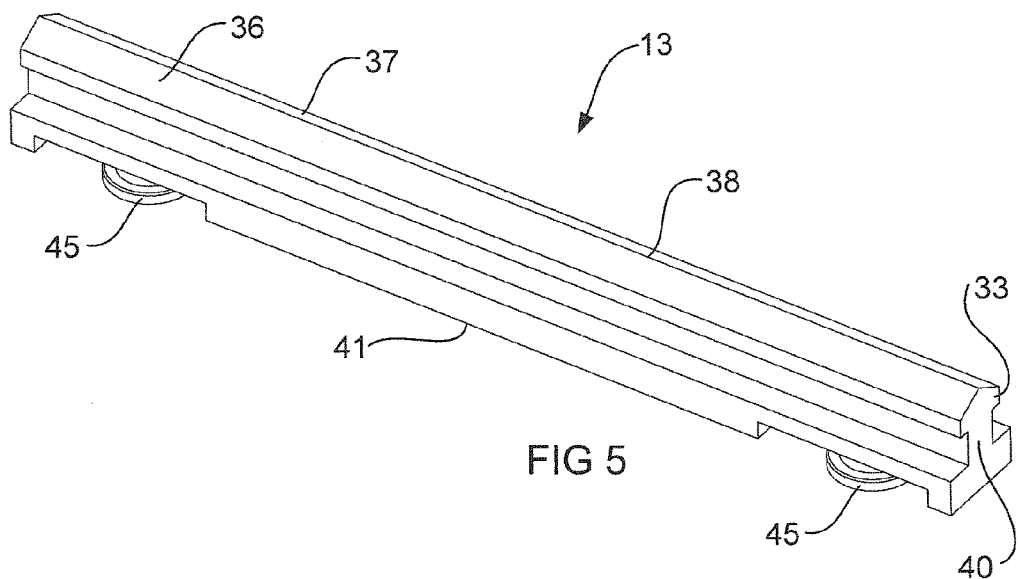
FIGS. 5 and 6 are perspective and side views respectively of a fixing member according to the invention.
Figure 6:
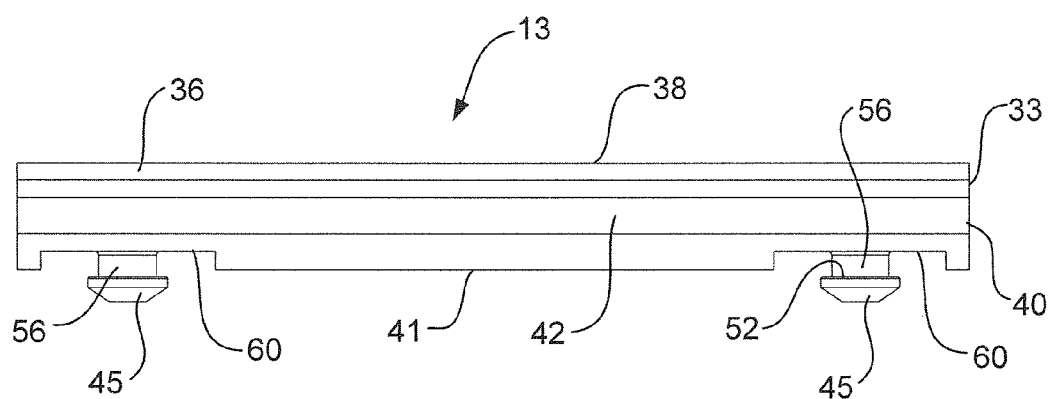

The above explanation will be better understood with reference to FIGS. 5 to 7. In those figures, a fixing member 13 is illustrated which includes a top or upper surface which is formed of two inclined surfaces 36 and 37 and which meet at an apex 38. The inclined surfaces 36 and 37 form part of a head 33 which extends from a web 40 that extends from a rail or a base 41. The head 33 has a greater lateral extent than the web 40 so that the head 33 overlies the web 40 on each side of the web 40. That arrangement defines a recess 42 (FIG. 6) on each side of the web 40.

FIG. 8 shows a fixing member 13 of the kind Illustrated in FIGS. 5 to 7 and described above with a pair of screen panels 14 in connection on either side of the member 13. It can be seen from FIG. 8, that the side edges of the screen panels 14 are shaped complementary to the profiles of the fixing members 13, so as to create an interlock between the side edges of the screen panels 14 and the fixing member 13. It can further be seen that the side edges of the screen panels 14 are in abutting engagement at the position above the apex 38 of the fixing member 13.

Returning to FIGS. 5 to 7, the fixing members 13 include a pair of projections 45 that extend from a base 41 of the members 13. The projections are cylindrical and are best shown in FIG. 7 and include first and second annular portions 47 and 48. The first annular portion 47 is of greater outer diameter than the second annular portion 48. The second annular portion 48 terminates in a frustoconical end 51.

The first and second annular portions 47 and 48 define a shoulder 52 that faces towards the base 41.

The profile of the fixing members 13 as it applies to interconnection with the side edges of screen panels 14 is described in co-pending Australian patent application no. 2012201297 filed by applicant with a claim to priority of 3 Mar. 2011. The disclosure of that application is herein incorporated by cross reference in its entirety.

Figure 9:
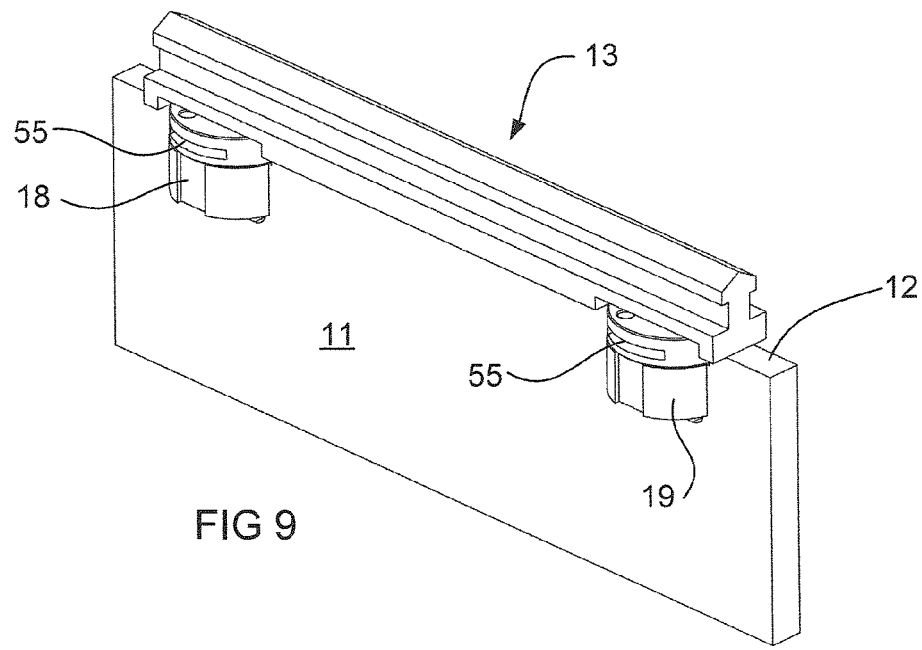
FIG. 9 is a perspective view of the beam portion of FIG. 3, with a fixing member attached.
Figure 10:
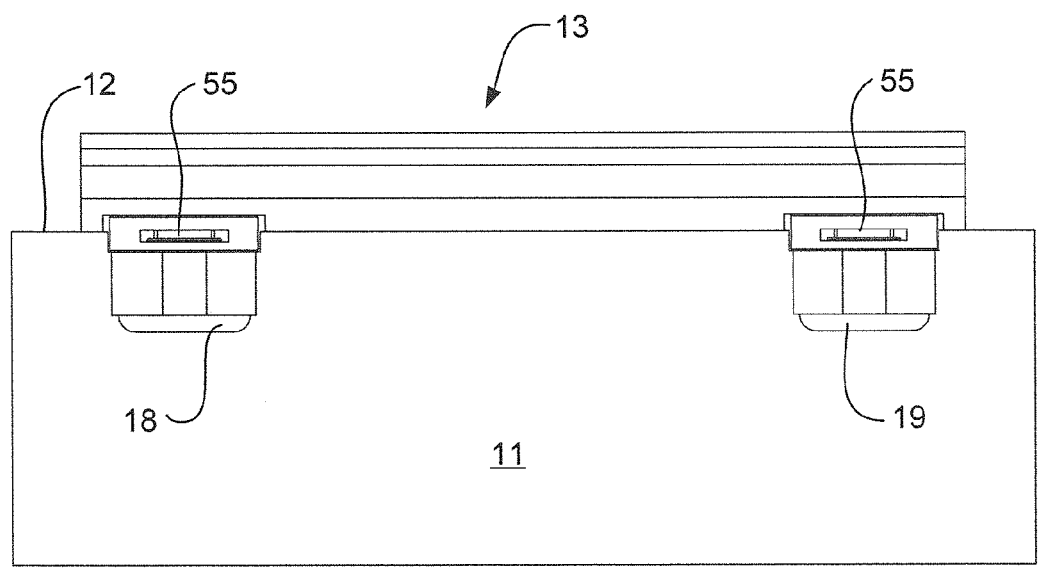
FIG. 10 is a side view of the beam portion of FIG. 9.
Figure 11:
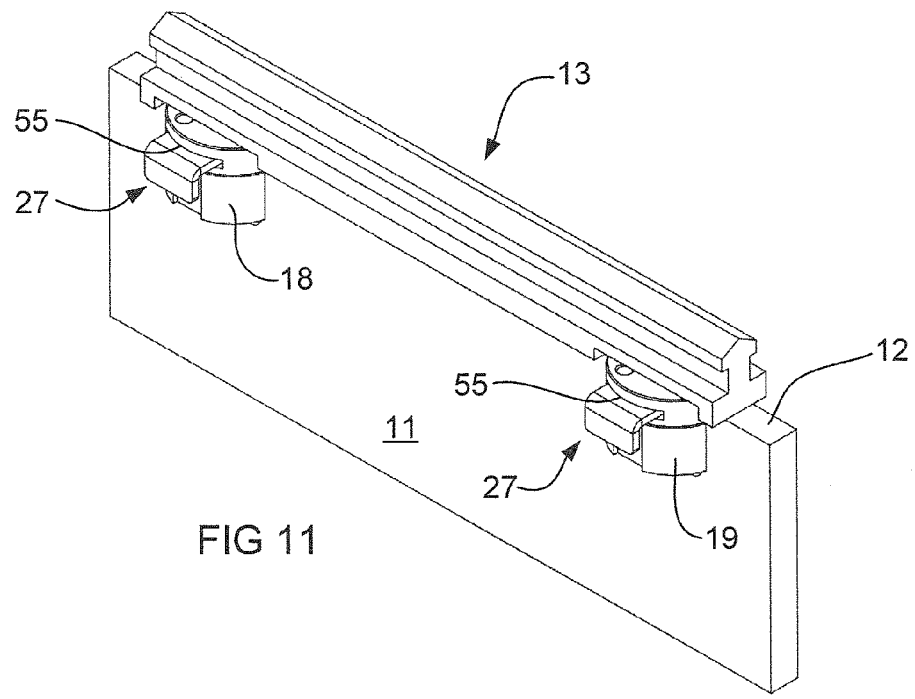
FIG. 11 is a perspective view of the beam portion of FIG. 9 with locking clips installed.

FIGS. 9 to 11 illustrate the fixing members 13 attached to the beam 11. FIGS. 9 and 10 show that attachment without the locking clips 27 inserted, while FIG. 11 shows the locking clips 27 in place.

With respect to FIGS. 9 and 10, the fixing members 13 have been positioned relative to the beam 11 with the projections 45 (FIGS. 5 and 6) inserted through the openings of the annular rings 18 and 19. FIGS. 9 and 10 further show the openings 55 into which the locking clips 27 can be inserted. Those openings are also illustrated in FIGS. 2 and 3, while they are also clearly evident in FIG. 4.

With reference to FIG. 4, a pair of openings $55_1$ and $55_2$ is shown at 90° to one another. While not apparent in the figures, it is to be appreciated that the annular rings 18 and 19 actually include four openings 55, spaced at 90° to each other and provided in the second parts 21 and 23 of the annular rings 18 and 19. This is to ensure that an opening 55 is always presented at a position which is convenient for insertion of a locking clip 27. It will be appreciated that, by the threaded engagement between the first parts 20, 22 and the second parts 21, 23, if only a single opening 55 is provided, it will not always be easy to ensure that the second parts 21, 23 will finish their threading at a position at which the single opening 55 will be positioned for convenient insertion of a locking clip 27. For example, the opening $55_1$ shown in FIG. 4 will not conveniently receive a locking clip 27, but by the provision of the second opening $55_2$, the locking clip 27 is easily installed. Thus, the provision of multiple openings 55 will ordinarily ensure that an opening 55 is always positioned for convenient acceptance of the locking clip 27.

With the fixing members 13 installed relative to the beam edges 11 as shown in FIGS. 9 and 10, i.e. with the projections 45 inserted into the annular rings 18 and 19, the annular portion 48 of the projections 45 is positioned in alignment with the openings 55. Locking clips 27 can therefore be inserted through the openings 55 to engage within the surfaces 56 of the annular portions 48. The arms 31 of the locking clip 27 will splay outwardly as that engagement takes place and each projection 45 enters the entrance portion 32 of the locking clips 27. As the arms 31 move relative to the projections 45 and the annular portions 48 are received within the spaces 30, the arms 31 can resiliently return to the position shown in FIG. 4 and the projections 45 are thus captured against movement out of the annular rings 18 and 19 by the locking clips 27, in particular by engagement between the locking clips 27 and the shoulders 52.

As is apparent from FIGS. 6 and 10, the base 41 of the fixing member 13 includes recesses 60 for receipt of the upper projecting portion of the annular rings 18 and 19. This allows the portion of the base 41 between the recesses 60 to rest on the facing surface of the edge 12 of the beam 11.

Advantageously, prior to securing the locking clips 27 in place, the fixing members 13 and any screen panels 14 connected to them can be shifted by virtue of the outer diameter of the first annular portion 47 (FIG. 7) of the projections 45, being of reduced diameter compared to the internal diameter of the openings of the annular rings 18 and 19 so that accurate alignment of the panels 14 can be made. As indicated earlier, the movement can typically be up to 8 mm in any direction. Once the fixing members 13 and the screen panels 14 have been accurately aligned, the locking clips 27 can be inserted to fix the position of the fixing members 13 on the beams 11 and thus to fix the screen panels 14 in place. It is to be appreciated that the fixing members 13 and the screen panels 14 can shift away from the edge 12, ie lift away from the edge 12, during vibration of the screen deck 10, but that movement is not movement that results in subsequent misalignment of the screen panels from the installed position.

Further advantageously, the locking clips 27 can be inserted from above the screening deck 10, so that access to beneath the deck is not required for installation of screen panels. This is far more favourable than requiring access to below the deck.

Figure 12:
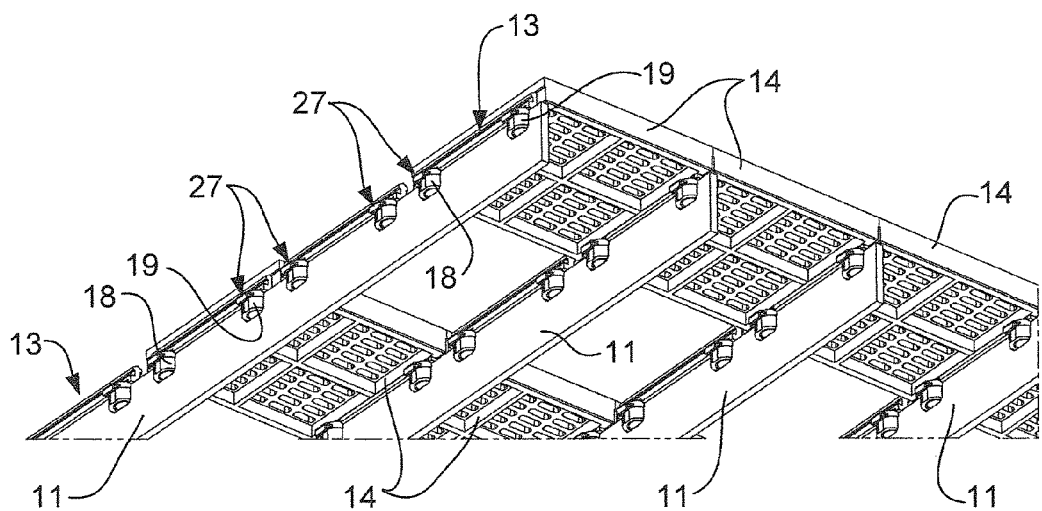
FIG. 12 is an underneath view of the screening deck of FIG. 1.

FIG. 12 is an underneath view of a portion of the deck 10 showing the beams 11, the fixing members 13, the panels 14, the annular rings 18 and 19 and the locking clips 27. As in FIG. 1, several of the panels 14 are absent from Figure to clearly illustrate the invention.

Throughout the description and claims of this specification the word "comprise" and variations of that word, such as "comprises" and "comprising", are not intended to exclude other additives, components, integers or steps.

The invention described herein is susceptible to variations, modifications and/or additions other than those specifically described and it is to be understood that the invention includes all such variations, modifications and/or additions which fall within the spirit and scope of the present disclosure.

We claim:

1. A screening apparatus comprising:
   a plurality of spaced apart, substantially parallel elongate beams;
   a plurality of screen panels mounted to the beams to form a broad screening surface, each of the panels being generally square or rectangular to define four side edges and the panels being mounted adjacent to each other so that facing side edges of adjacent panels are in close facing relationship, each panel being mounted to a pair of beams along opposite side edges to bridge between two adjacent beams;
   elongate fixing members for mounting the panels to the beams, wherein the elongate fixing members extend in the longitudinal direction of the beams, are fixed to an upwardly facing edge of the beams and engage opposite side edges of the panels, the elongate fixing members including a pair of projections that extend into openings provided in the edge of the beams, each projection being engaged by a locking clip to lock the projection against release from the opening;
   the openings into which the projections extend being of a greater diameter than the outside diameter of the projections, so that the projections are a loose fit within the openings to allow movement of the fixing members and the screen panels before the projections are engaged by a locking click to lock the projection against release from the opening, the openings being provided by rings fitted into the slots formed in the edge of the beams and the rings being defined by a wall having a locking opening through which the locking clip extends for engagement with a projection.

2. A screening apparatus according to claim 1, the rings being formed of two or more parts.

3. A screening apparatus according to claim 2, the rings being formed by a first part that is fixed into a slot in the edge of the beam and a second part that is connected to the first part.

4. A screening apparatus according to claim 3, the first part being welded to the beam within the slot.

5. A screening apparatus according to claim 4, the second part including the locking opening through which the locking clip extends.

6. A screening apparatus according to claim 5, the second part including at least two locking openings through which the locking clip can extend.

7. A screening apparatus according to claim 3, and further comprising a threaded engagement for fixing the second part to the first part.

8. A screening apparatus according to claim 1 the projections extending from an elongate rail of the elongate fixing member that extends along the edge of the beam and including a shoulder which faces the rail, the locking clip engaging the projection between the shoulder and rail so that movement of the projection in a direction out of the opening is prevented by engagement of the locking clip and the shoulder.

9. A screening apparatus according to claim 8, the projection being formed as a cylinder and including an annular recess coaxial with the cylinder and the shoulder being a face of the recess that faces the rail.

10. A screening apparatus according to claim 1, the locking clip being releasable from engagement with a projection to allow the elongate fixing member to be released from a beam.

11. A screening apparatus according to claim 1, the elongate fixing members extending for substantially the full length of each of the opposite side edges of the panels and engaging the side edges along substantially their full length, the projections being positioned toward each longitudinal end of the elongate fixing members.

12. A screening apparatus comprising:
   a plurality of spaced apart, substantially parallel elongate beams;
   a plurality of screen panels mounted to the beams to form a broad screening surface, each of the panels being generally square or rectangular to define four side edges and the panels being mounted adjacent to each other so that facing side edges of adjacent panels are in close facing relationship, each panel being mounted to a pair of beams along opposite side edges to bridge between two adjacent beams;
   elongate fixing members for mounting the panels to the beams, wherein the elongate fixing members extend in the longitudinal direction of the beams, are fixed to an upwardly facing edge of the beams and engage opposite side edges of the panels, the fixing members including a pair of projections that extend into openings provided in the edge of the beams, each projection being engaged by a locking clip to lock the projection against release from the opening;
   the openings into which the projections extend being of a greater diameter than the outside diameter of the projections, so that the projections are a loose fit within the openings to allow movement of the fixing members and the screen panels before the projections are engaged by a locking clip to lock the projection against release from the opening, the openings being provided by rings fitted into the slots formed in the edge of the beams and which project above the edge of the beams.

13. A screening apparatus according to claim 12, the portion of the rings projecting above the edge of the beams being received within a base section of the fixing members.

14. A screening apparatus according to claim 12, the elongate fixing members extending for substantially the full length of each of the opposite side edges of the panels and engaging the side edges along substantially their full length, the projections being positioned toward each longitudinal end of the elongate fixing members.

15. A screening apparatus comprising:
a plurality of spaced apart, substantially parallel elongate beams;
a plurality of screen panels mounted to the beams to form a broad screening surface, each of the panels being generally square or rectangular to define four side edges and the panels being mounted adjacent to each other so that facing side edges of adjacent panels are in close facing relationship, each panel being mounted to a pair of beams along opposite side edges to bridge between two adjacent beams;
elongate fixing member for mounting the panels to the beams, wherein the elongate fixing members extend in the longitudinal direction of the beams, are fixed to an upwardly facing edge of the beams and engage opposite side edges of the panels, the elongate fixing members including a pair of projections that extend into openings provided in the edge of the beams, each projection being engaged by a locking clip to lock the projection against release from the opening;
the openings into which the projections extend being of a greater diameter than the outside diameter of the projections, so that the projections are a loose fit within the openings to allow movement of the fixing members and the screen panels before the projections are engaged by a locking clip to lock the projection against release from the opening, the locking clip including a pair of arms which are spaced apart to define a space within which the projection is engaged.

16. A screening apparatus according to claim 15, the locking clip being flexible so that the arms can shift outwardly from a locking position to accept a projection and can return to the locking position on receipt of the projection into an engagement position.

17. A screening apparatus according to claim 15, the elongate fixing members extending for substantially the full length of each of the opposite side edges of the panels and engaging the side edges along substantially their full length, the projections being positioned toward each longitudinal end of the elongate fixing members.

18. A method of assembling a screening apparatus, the apparatus comprising:
a plurality of spaced apart, substantially parallel elongate beams which include a plurality of openings formed in an upwardly facing edge of the beams, the openings being provided by rings fitted into slots formed in the edge of the beams and the rings being defined by a wall which includes a locking opening;
a plurality of screen panels for mounting to the beams to form a broad screening surface, each of the panels being generally square or rectangular to define four side edges;
elongate fixing members for fixing the screen panels to the beams, the fixing members including projections for extending into the openings of the beams;
the openings of the beams being of a greater diameter than the outside diameter of the projections, so that the projections are a loose fit within the openings;
wherein the method comprises the steps of;
mounting a pair of fixing members to a pair of beams by inserting the projections of the fixing members into the openings of the beams;
mounting a screen panel to the pair of fixing members;
shifting the panel and the fixing members relative to the beams so that each side edge of the panel that faces a side edge of an adjacent panel is in alignment with and in abutting contact with the facing side edge of the adjacent panel; and
inserting a locking clip through the locking opening to engage each projection to fix the fixing members in place on the beam.

* * * * *